United States Patent
Ma et al.

(10) Patent No.: US 9,851,267 B1
(45) Date of Patent: Dec. 26, 2017

(54) FORCE-SENSING ELEMENT

(71) Applicant: Microsoft Technology Licensing, LLC, Redmond, WA (US)

(72) Inventors: Siyuan Ma, Bothell, WA (US); James David Holbery, Bellevue, WA (US); Anatoly Churikov, Las Vegas, NV (US); Flavio Protasio Ribeiro, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/170,877

(22) Filed: Jun. 1, 2016

(51) Int. Cl.
| | |
|---|---|
| G01L 1/04 | (2006.01) |
| G01L 1/20 | (2006.01) |
| G06F 3/041 | (2006.01) |
| C09D 5/24 | (2006.01) |
| C09D 165/00 | (2006.01) |

(52) U.S. Cl.
CPC ............ G01L 1/205 (2013.01); C09D 5/24 (2013.01); C09D 165/00 (2013.01); G06F 3/0414 (2013.01); *G06F 2203/04103* (2013.01)

(58) Field of Classification Search
CPC ......... G01L 1/205; C09D 5/24; C09D 165/00; G06F 3/0414; G06F 2203/04103
USPC ...................................................... 73/862.68
See application file for complete search history.

(56) References Cited

U.S. PATENT DOCUMENTS

| | | | |
|---|---|---|---|
| 5,304,295 A | 4/1994 | Kim et al. | |
| 5,381,149 A * | 1/1995 | Dougherty | G21K 1/10 |
| | | | 252/583 |
| 5,641,391 A | 6/1997 | Hunter et al. | |
| 5,976,284 A | 11/1999 | Calvert et al. | |
| 6,360,612 B1 | 3/2002 | Trantzas et al. | |
| 7,178,405 B2 | 2/2007 | Sato | |
| 7,531,203 B2 | 5/2009 | Tao et al. | |
| 8,020,456 B2 | 9/2011 | Liu et al. | |
| 8,187,865 B2 | 5/2012 | Yun et al. | |
| 8,479,585 B2 | 7/2013 | Shaw-Klein | |
| 2008/0251759 A1* | 10/2008 | Kalb | C07C 211/62 |
| | | | 252/183.13 |
| 2013/0028963 A1* | 1/2013 | Fletcher | A61K 9/1271 |
| | | | 424/450 |
| 2013/0041244 A1* | 2/2013 | Woias | A61B 5/0215 |
| | | | 600/381 |
| 2013/0281745 A1* | 10/2013 | Brizius | B01J 31/06 |
| | | | 570/190 |

(Continued)

OTHER PUBLICATIONS

Shi, Y. et al., "Nanostructured conductive polypyrrole hydrogels as high-performance, flexible supercapacitor electrodes," Journal of Materials Chemistry A, vol. 2, No. 17, May 7, 2014, Published Online Mar. 5, 2014, 6 pages.

(Continued)

*Primary Examiner* — Max Noori
(74) *Attorney, Agent, or Firm* — Alleman Hall Creasman & Tuttle LLP

(57) ABSTRACT

Examples for force-sensing elements are disclosed. An example method for forming a force sensor includes printing a suspension of a hollow-sphere conductive polymer in a liquid carrier over an electrode pair on a substrate, evaporating the liquid carrier, and encapsulating the electrode pair and hollow-sphere conductive polymer to form a force sensor.

20 Claims, 13 Drawing Sheets

(56) References Cited

U.S. PATENT DOCUMENTS

| | | | | |
|---|---|---|---|---|
| 2015/0125596 | A1* | 5/2015 | Ramakrishnan | H01Q 7/00 427/125 |
| 2015/0168236 | A1* | 6/2015 | Bao | G01L 7/041 73/862.625 |
| 2015/0331533 | A1 | 11/2015 | McMillen | |
| 2015/0349310 | A1* | 12/2015 | Viner | C08G 75/00 429/126 |

OTHER PUBLICATIONS

Park, M. et al., "Design of conductive composite elastomers for stretchable electronics," Nano Today, vol. 9, No. 2, Apr. 2014, 17 pages.

Joo, Y. et al., "Silver nanowire-embedded PDMS with a multiscale structure for a highly sensitive and robust flexible pressure sensor," Nanoscale, vol. 7, No. 14, Apr. 14, 2015, Published Online Mar. 5, 2015, 8 pages.

He, W. et al., "Polypyrrole/Silver Coaxial Nanowire Aero-Sponges for Temperature-Independent Stress Sensing and Stress-Triggered Joule Heating," ACS Nano, vol. 9, No. 4, Apr. 28, 2015, Published Online Mar. 26, 2015, 8 pages.

Ha, M. et al., "Bioinspired Interlocked and Hierarchical Design of ZnO Nanowire Arrays for Static and Dynamic Pressure-Sensitive Electronic Skins," Advanced Functional Materials, vol. 25, No. 19, May 20, 2015, Published Online Apr. 7, 2015, 9 pages.

Lee, et al., "A transparent bending-insensitive pressure sensor", In Journal of Nature Nanotechnology, Jan. 25, 2016, pp. 1-7.

Pan, et al., "An ultra-sensitive resistive pressure sensor based on hollow-sphere microstructure induced elasticity in conducting polymer film", In Journal of Nature Communications, vol. 5, Jan. 6, 2014, pp. 1-8.

Someya, et al., "Conformable, flexible, large-area networks of pressure and thermal sensors with organic transistor active matrixes", In Proceedings of the National Academy of Sciences of the United States of America, vol. 102, No. 35, Aug. 30, 2005, pp. 12321-12325.

"International Search Report and Written Opinion Issued in PCT Application No. PCT/US2017/034095", dated: Jul. 21, 2017, 16 Pages.

Khalili, et al., "Development, Fabrication, and Modeling of Highly Sensitive Conjugated Polymer based Piezoresistive Sensors in Electronic Skin Applications", In Proceedings of International Society for Optical Engineering, vol. 9800, Apr. 18, 2016, 8 Pages.

* cited by examiner

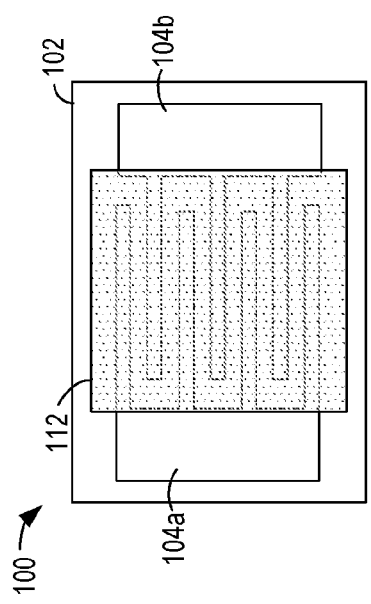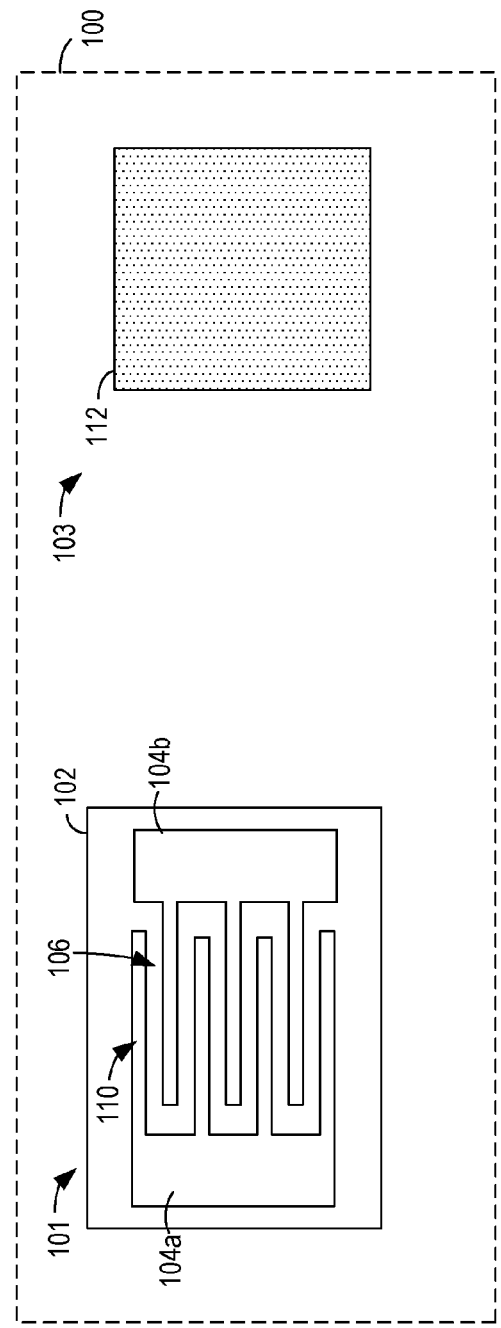

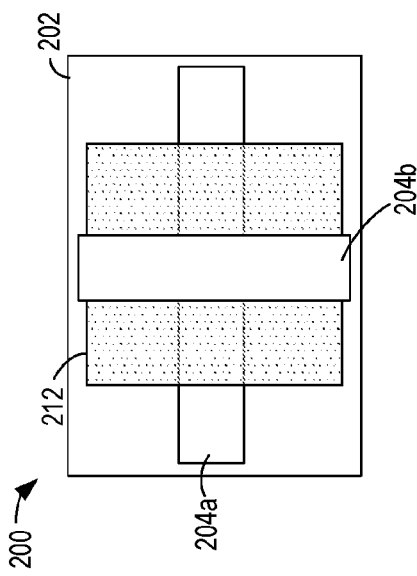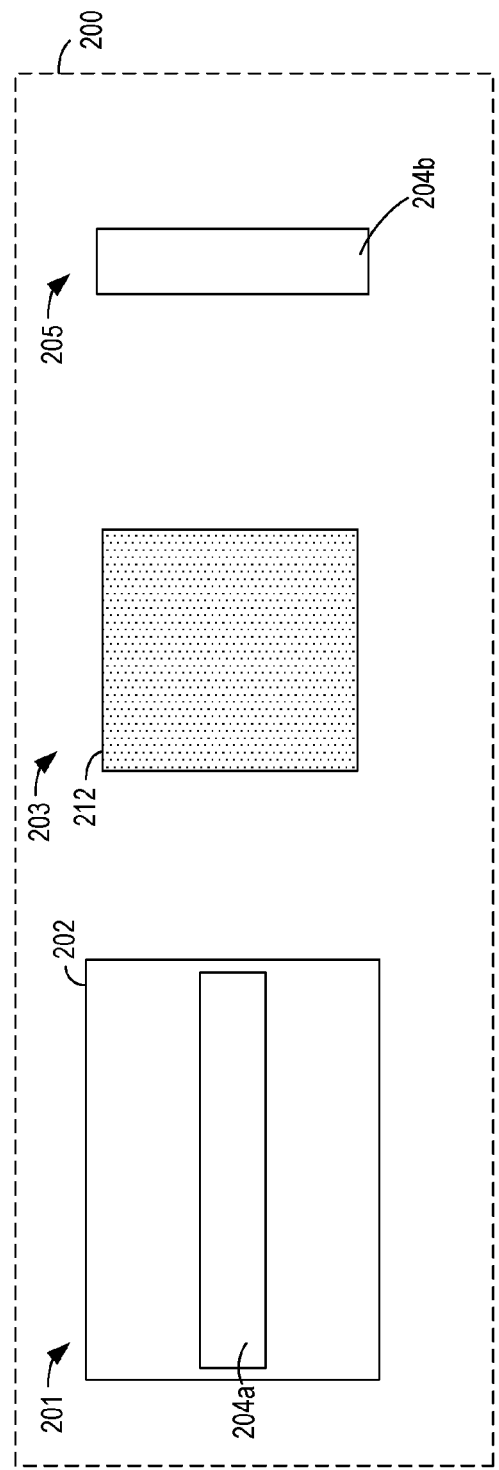

US 9,851,267 B1

FORCE-SENSING ELEMENT

BACKGROUND

Force sensors may be utilized to measure changes in force, pressure, and/or strain. Such sensors may have many different uses. For example, force sensors may be used to measure weights, to monitor the integrity of structural components, and to serve as user input devices for computing devices.

SUMMARY

Examples are disclosed that relate to force sensors configured to sense relatively small forces. One disclosed example provides a method for forming a force sensor, the method including printing a suspension of a hollow-sphere conductive polymer in a liquid carrier over an electrode pair on a substrate, evaporating the liquid carrier, and encapsulating the electrode pair and hollow-sphere conductive polymer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A shows a top view of an example force-sensing element, and FIG. 1B shows a view of the force-sensing element of FIG. 1A with a hollow-sphere conductive polymer matrix disposed between first and second electrodes.

FIG. 2A shows a top view of another example force-sensing element, and FIG. 2B shows a view of the force-sensing element of FIG. 2A with a hollow-sphere conductive polymer matrix disposed between first and second electrodes.

DETAILED DESCRIPTION

Figure 3:
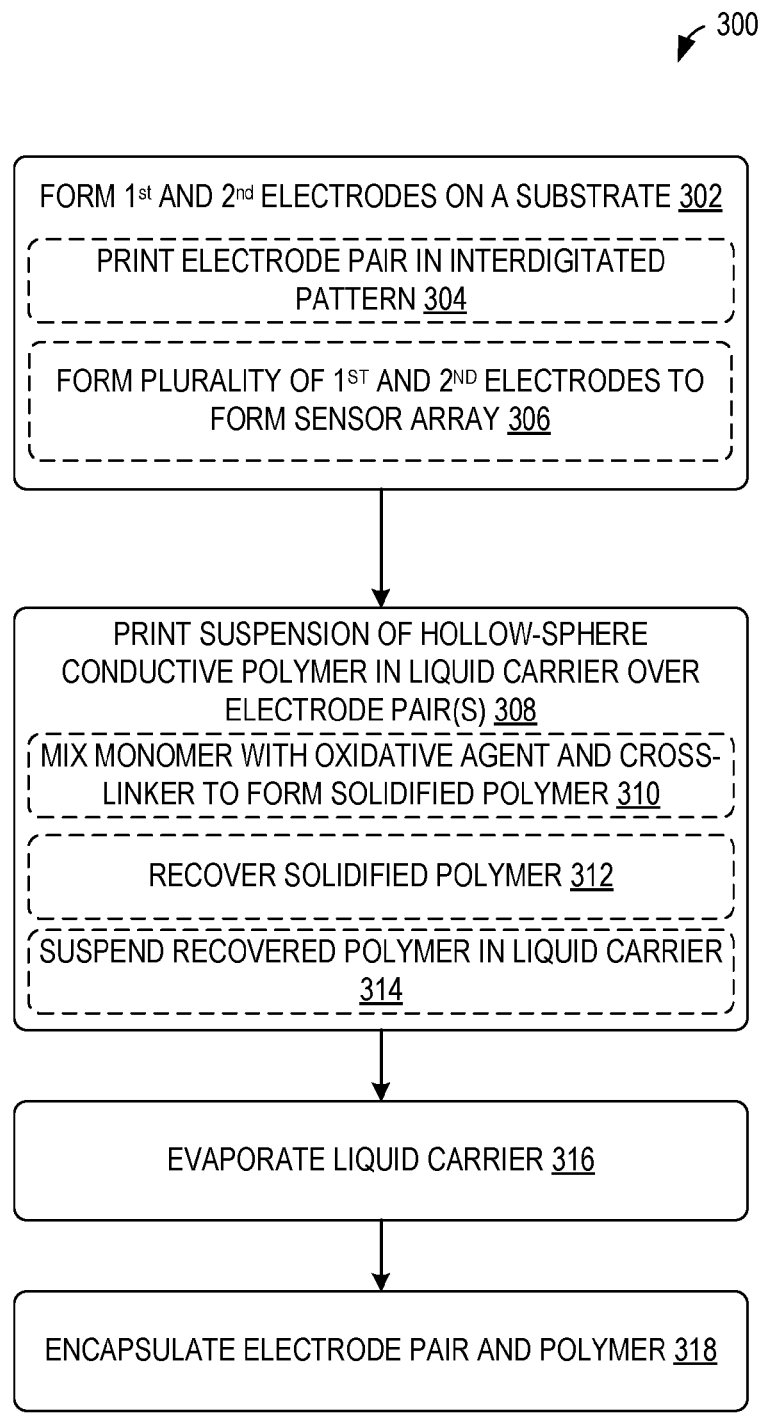
FIG. 3 is a flow chart illustrating an example method for manufacturing a force-sensing element.

Force-sensing elements, also referred to herein as force sensors, may be incorporated into a variety of devices to provide touch input sensing, strain sensing, pressure sensing, and/or other sensing functions. Some force sensors may have a low sensitivity to slight changes in force, which may limit the use of the sensors in certain contexts.

Thus, examples are disclosed herein that relate to force-sensing elements that may have relatively higher sensitivities, such as being capable of detecting forces less than 0.1 N. The example force-sensing elements utilize a hollow-sphere conductive polymer layer disposed between an electrode pair to sense force. In one example, the hollow-sphere conductive polymer layer includes a matrix of hollow-sphere polypyrrole structures. While solid polypyrrole may be stiff and brittle due to its rigid conjugated-ring backbone, by forming the polypyrrole into a spherical shell geometry, the brittle nanostructured materials may be made to exhibit a tunable effective elastic modulus capable of withstanding large effective strains and stresses. The hollow-sphere structure allows the polypyrrole to elastically deform and recover upon the application and release of external pressure, thereby promoting the contact stability of the force sensor and endowing the device with stable and reproducible sensing performance.

The hollow-sphere polypyrrole may be synthesized by mixing two reactant solutions and then casting the resulting mixture onto a substrate comprising an electrode. However, in this method, polypyrrole wet film casting and polypyrrole polymerization/solidification are combined, and the structure solidifies within 2-3 seconds. Due to this short worktime, it may be difficult to directly use this system to fabricate complicated patterns in large-scale mass production facilities (e.g. automatic coating and printing methods). Further, fabrication of an array of force sensing elements may require a separate casting process to be performed for each element in the array, which may be slow and inefficient.

Thus, the disclosed examples separate sphere synthesis and deposition/patterning into two independent processes. By first synthesizing the hollow-sphere polypyrrole and then suspending the synthesized hollow-sphere polypyrrole in a proper liquid carrier, various methods of depositing/patterning (manual micro pipetting, pneumatic dispensing, spraying, screen printing, inkjet printing, gravure printing, electrohydrodynamic printing, etc.) may be used to form large-area and/or complicated force-sensing patterns. Further, the disclosed sensor examples may be formed from flexible materials, including flexible substrates and electrodes, which may help to broaden a range of use compared to more rigid force sensors.

FIGS. 1A and 1B show a top view of an example force sensor 100. FIG. 1A shows the sensor 100 in an assembled state, and FIG. 1B shows the sensor 100 in separated layers. A first layer 101 (shown as a separate layer in FIG. 1B) comprises a substrate 102 including a first electrode 104a and a second electrode 104b that form an electrode pair. In the illustrated example, the first electrode 104a is interdigitated with the second electrode 104b, but in other examples, the first electrode and the second electrode may be formed in any other suitable configuration. The substrate 102 may be rigid or flexible, and formed from a suitable non-conductive material. Examples of suitable substrate materials include, but are not limited to, polyethylene terephthalate (PET), polyimide, polycarbonate, polysiloxane, polyurethane, polystyrene, polyether ether ketone, and other insulating polymers.

The first and second electrodes 104a and 104b may be formed in any suitable manner. In some examples, the electrodes may be printed (e.g., screen printed, ink jet printed) on the substrate. In another example, the electrodes may be formed via depositing a conductor over an entirety of the substrate and then etching the electrode patterns. In yet other examples, a masking/deposition method (e.g. sputtering, evaporation) may be used to form the electrode pattern.

The first and second electrodes 104a and 104b may be formed from any suitable conductive material. For example, the first and second electrodes may be formed from silver, copper, aluminum, or other metal. As illustrated in FIGS. 1A and 1B, the first and second electrodes are separated via an insulating gap 106 (e.g., air or a suitable dielectric material), and each comprises protruding fingers/prongs 110 that extend to form the interdigitated pattern.

A second layer 103 of the sensor 100 includes a hollow-sphere conductive polymer layer 112. As described above, the hollow-sphere conductive polymer layer 112 may comprise polypyrrole hollow nanostructures. In one example, the polypyrrole hollow nanostructures may include hollow structures having diameters ranging from 100-2000 nm, although other diameters may be used in other examples.

The hollow-sphere conductive polymer layer 112 may be formed from a solidified hollow-sphere conductive polymer film or other structure that is recovered and suspended in a liquid carrier. The hollow-sphere conductive polymer suspension may be printed onto the first and second electrodes, and the liquid carrier may then evaporate, forming the hollow-sphere conductive polymer layer. An example fabrication process is described in more detail below.

The use of a flexible substrate and elastic conductive pathway (in the form of the hollow-sphere conductive polymer) may allow the sensor to be incorporated into a wide variety of objects. For example, the sensor may be integrated with and/or form at least a portion of an article of clothing, an upholstered object (e.g., furniture), a soft-touch housing for a handheld computing device or other electronic device (e.g. a fabric or elastomeric housing), a band for a wearable device, and/or any other suitable flexible/deformable item.

Referring again to FIG. 1A, the hollow-sphere conductive polymer layer 112 is disposed over the electrodes 104a and 104b and bridges the gap 106 between the first electrode and second electrode. The hollow-sphere conductive polymer layer 112 may be formed from hollow spheres of polypyrrole or other suitable conductive polymer, such as polyacetylene, polyaniline, poly(3-alkylthiophenes), poly(p-phenylene vinylene), poly(3,4-ethylenedioxythiophene), polystyrene sulfonate, or metallic conductors (e.g., silver, gold, copper, aluminum). The hollow spheres may contact the first and/or second electrode and other spheres within the matrix with a first amount of surface area when the sensor 100 is not undergoing any strain or deformation. When force is applied to the sensor, at least some hollow spheres may be deformed. As a result, a surface area of hollow spheres contacting each other and/or the electrodes changes when force is applied to the sensor. This leads to a measurable change in resistance, thereby allowing force to be sensed.

It is to be understood that the sensor 100 illustrated in FIGS. 1A and 1B is an example configuration of a force sensor including a hollow-sphere conductive polymer, and that other configurations are possible without departing from the scope of the disclosure.

As another example, rather than the first electrode and second electrode being interdigitated with one another, the first and second electrodes may each be configured as a strip arranged perpendicularly to one another and separated by a layer of the hollow-sphere conductive polymer. FIGS. 2A and 2B show a top view of an example of such a force sensor 200, where FIG. 2A shows the sensor 200 in an assembled state, and FIG. 2B shows the sensor 200 in separated layers.

A first layer 201 comprises a substrate 202 including a first electrode 104a. A second layer 203 of the sensor 200 includes a hollow-sphere conductive polymer layer 212 as described above with regard to FIGS. 1A-1B. A third layer 205 of the sensor includes a second electrode 204b. The second electrode 204b may be positioned perpendicular to the first electrode 204a, such that a longitudinal axis of the second electrode 204b is perpendicular to a longitudinal axis of the first electrode 204a. The substrate 202, first electrode 204a, and second electrode 204b may be formed from similar materials and/or formed similarly as substrate 102, first electrode 104a, and second electrode 104b of FIGS. 1A and 1B.

In this way, the first electrode 204a and second electrode 204b may form an electrode pair, with the hollow-sphere conductive polymer layer 212 disposed therebetween. In some examples, an additional insulating layer may be included on top of the first layer. The additional insulating layer may include an opening positioned and sized to receive the hollow-sphere conductive polymer layer 212, in order to define the effective sensing area. This may help to avoid electrical shorting when multiple sensors are formed as an array.

FIG. 3 shows a flow diagram illustrating an example method 300 of manufacturing a force sensor, such as sensor 100 of FIGS. 1A and 1B or sensor 200 of FIGS. 2A and 2B. At 302, method 300 includes forming first and second electrodes on a substrate. As indicated at 304, the electrodes may be formed as a pair in an interdigitated pattern, as in the example of FIGS. 1A-1B. The electrodes may be formed in any suitable manner, such as by printing, patterned deposition, or etching of conductive material. In another example, the first electrode may be printed or otherwise formed on the substrate, and the second electrode may be formed/added at a later time, after deposition of the hollow-sphere conductive polymer layer, as in the example of FIGS. 2A-2B.

Figure 12:
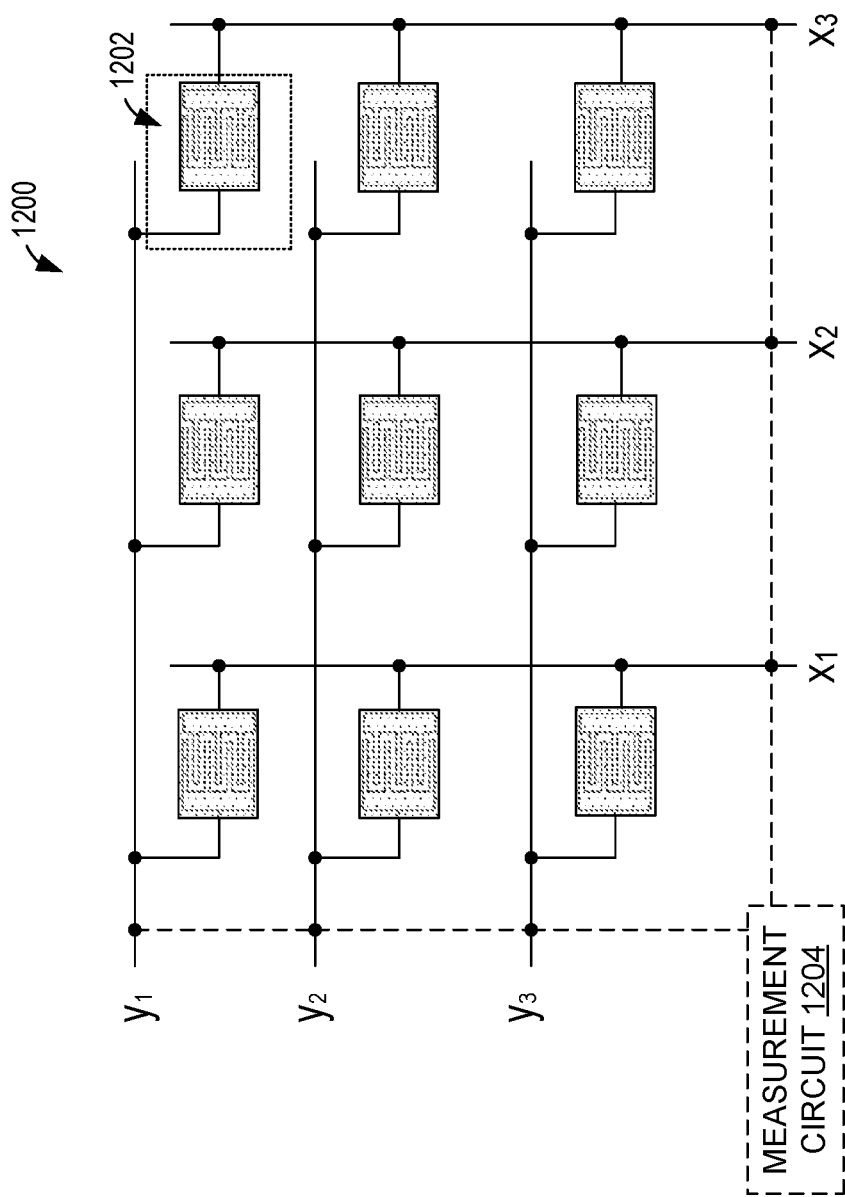
FIG. 12 schematically shows an example force-sensing element array.

At 306, method 300 optionally includes forming a plurality of first and second electrodes to form a sensor array. FIG. 12 shows an example schematic diagram depicting an example sensor array 1200 comprising a plurality of force sensors 1202 arranged in a grid formation. Sensors 100 of FIGS. 1A and 1B (as shown) and 200 of FIGS. 2A and 2B are examples of sensors that may be used as one or more of force sensors 1202. Although an example arrangement is illustrated in FIG. 12, any other suitable arrangement of multiple sensors in communication with one another and/or an intermediate computing device/communication bus may be used. Further, the array 1200 may be coupled to a measurement circuit 1204 to measure resistance between any column $x_i$ and any row $y_j$, where i and j each range in value from 1 to 3 (in the illustrated example; in other examples, i and j may range in value based on the number of rows/columns of sensors, respectively). In other examples, any different indexing and/or measurement arrangement may be used.

Continuing with FIG. 3, at 308 method 300 includes printing a suspension of a hollow-sphere conductive polymer in a liquid carrier over the electrode pair (or each electrode pair of a plurality of electrode pairs, if a sensor array is formed). The suspension of the hollow-sphere conductive polymer may be formed by mixing an appropriate monomer or other precursor with an oxidative agent and cross-linker, as indicated at 210, which results in polymerization of the monomer into the hollow-sphere structure. In one example, the monomer may be pyrrole, such that a hollow-sphere polypyrrole polymer is formed. In other examples, other monomers capable of forming conductive polymers may be used, such as aniline, thiophene, or other suitable monomers. As a more specific example, the hollow sphere polypyrrole may be formed using a multiphase reaction where an aqueous solution of an oxidative reagent, such an ammonium persulfate, is mixed with a solution containing a mixture of the pyrrole monomer, isopropanol, and phytic acid. The phytic acid molecule acts as a dopant and cross-linker of polypyrrole. An emulsion is formed upon mixing due to the phase separation between the organic and aqueous components. After exchanging the impurities with deionized water, the polypyrrole gel forms a hydrogel.

As mentioned above, the hollow-sphere conductive polymer structure formed in the polypyrrole synthesis described above solidifies relatively quickly (e.g., within three seconds), thus limiting its use to single-application casting configurations. As such, the initial hollow-sphere conductive polymer formation may be unsuitable for fabricating an array comprised of multiple sensors, as doing so may involve mixing a new batch of initial hollow-sphere conductive polymer for each sensor of the array.

Thus, the solidified hollow-sphere conductive polymer is recovered and then suspended in a liquid carrier, as indicated at 312 and 314, respectively. To recover the solidified polymer, the solidified polymer may be ground, crushed, or otherwise broken up into pieces. These pieces of recovered polymer are then mixed with an appropriate liquid carrier via ultrasonic agitation or other mechanism. Where the conductive polymer is polypyrrole, the liquid carrier may comprise a polar solvent. Examples of suitable solvents include, but are not limited to, methanol, ethanol, acetone, deionized water, acetonitrile, etc., and mixtures of suitable polar solvents. This suspension may be stable (remain as a suspension without forming sediment) for a longer duration, such as five hours or longer. The stability of suspension can be further improved by adding proper surfactant (e.g. ionic, neutral, or mixtures).

The suspension of the hollow-sphere conductive polymer in the liquid carrier may be printed on the electrode pair(s) using any suitable printing method. For example, the suspension may be screen printed, inkjet printed, gravure printed, electrohydrodynamic printed, pneumatic-driven extruded, manual micro pipetted, or stamped.

At 316, method 300 includes evaporating the liquid carrier. The liquid carrier may be air-dried, or via application of heat and/or air flow. At 318, method 300 includes encapsulating each electrode pair and the hollow-sphere conductive polymer layer. Any suitable electrically insulating material may be used as an encapsulating material. Examples include, but are not limited to, polyurethane-based materials, cellulose acetate, and silicone-based materials. In examples where a cross-over electrode configuration is used, the first electrode may be configured as a single strip printed or otherwise formed on the substrate, and the second electrode may be formed on top of the hollow-sphere conductive polymer layer prior to encapsulation.

Method 300 thus may allow a hollow-sphere conductive polymer to be printed into complex patterns and/or arrays, facilitating fabrication of a diverse array of sensor configurations on a large scale. Further, by using a hollow-sphere conductive polymer, the force sensors described herein may be highly sensitive to small amounts of force.

Figure 9A:
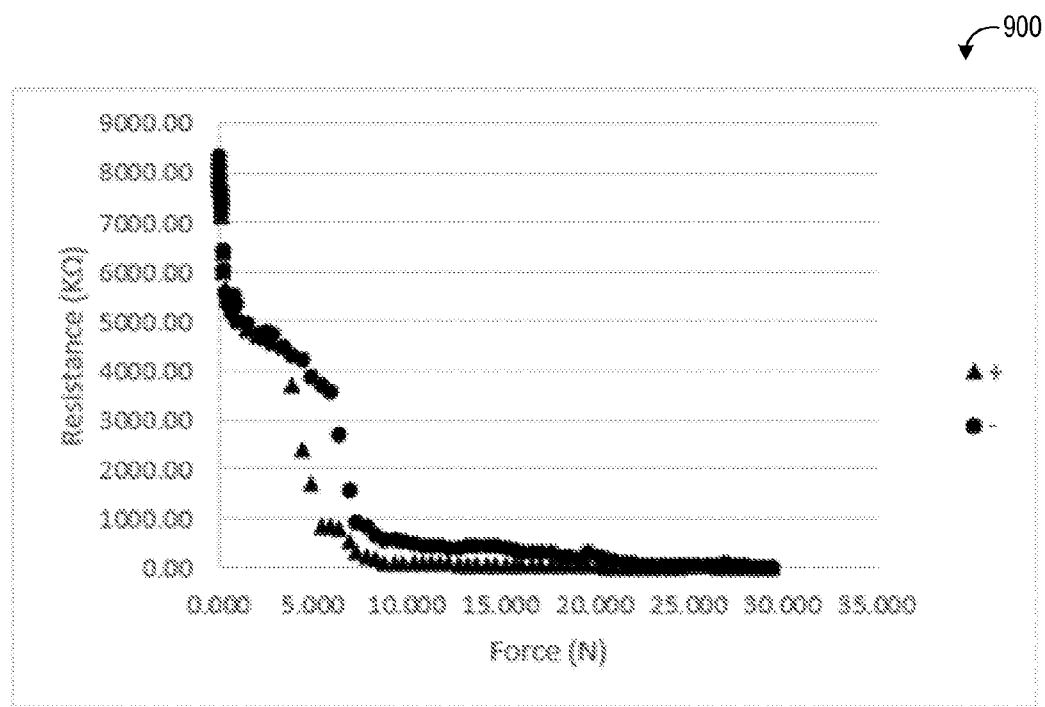
FIGS. 9A-11B show example plots of force sensitivity for example force-sensing elements.
Figure 9B:
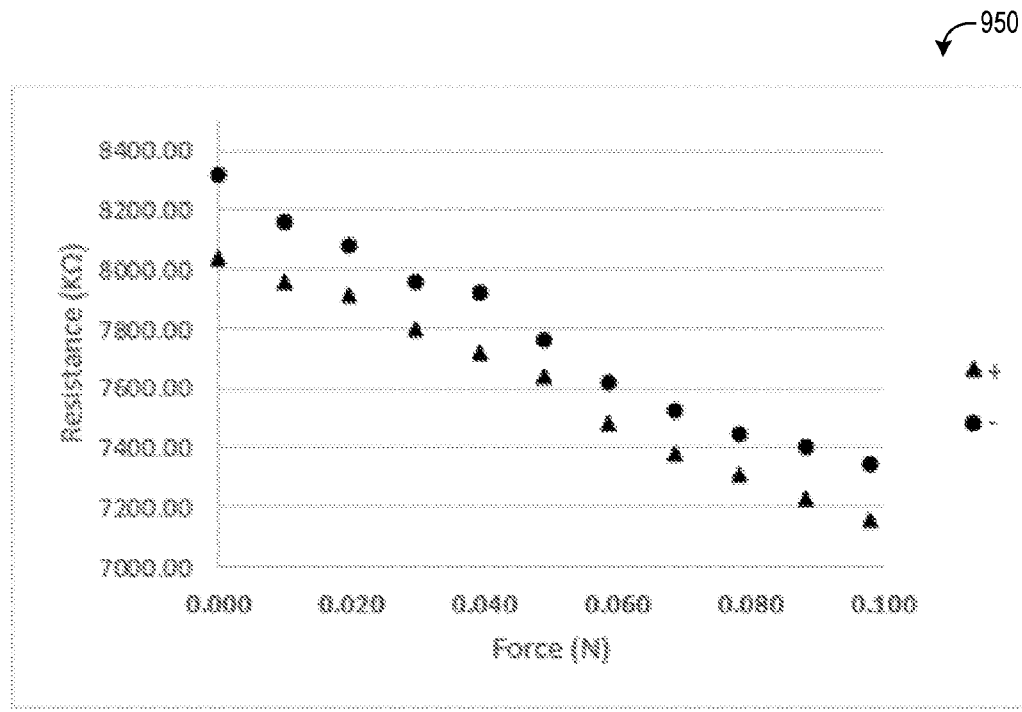

FIGS. 9A and 9B show example plots of resistance as a function of force for a force sensor having a cross-over electrode configuration, such as sensor 200 of FIGS. 2A and 2B. FIG. 9A is a plot 900 of resistance as a function of applied force for a range of forces between 0-30 N. The triangles represent application of force while the circles represent removal of applied force. As illustrated by plot 900, the sensor is able to detect application and removal of small amounts of force (e.g., in the range of less than 1 N to 10 N), as evidenced by the change in resistance when those amounts of force are applied and removed. FIG. 9B is a plot 950 representing a magnification of plot 900, specifically from 0-0.1N force. As shown in plot 950, the force sensor exhibits a linear sensitivity to applied and removed force in at least the illustrated range of forces.

Figure 10A:
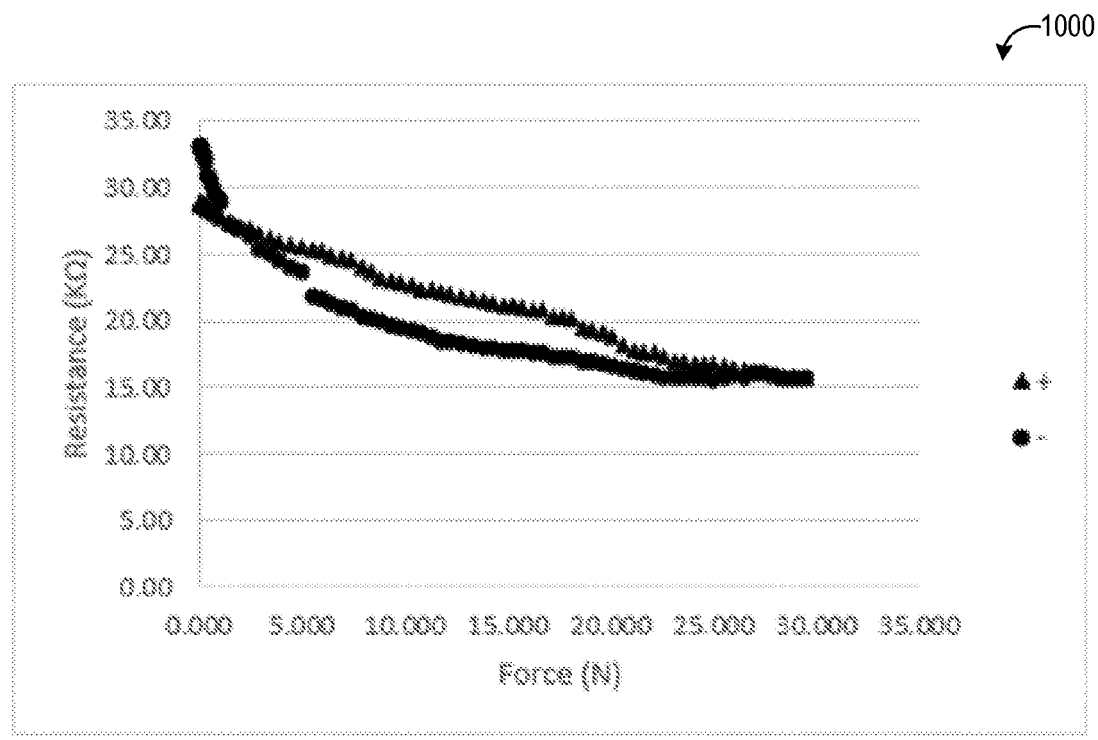
Figure 10B:
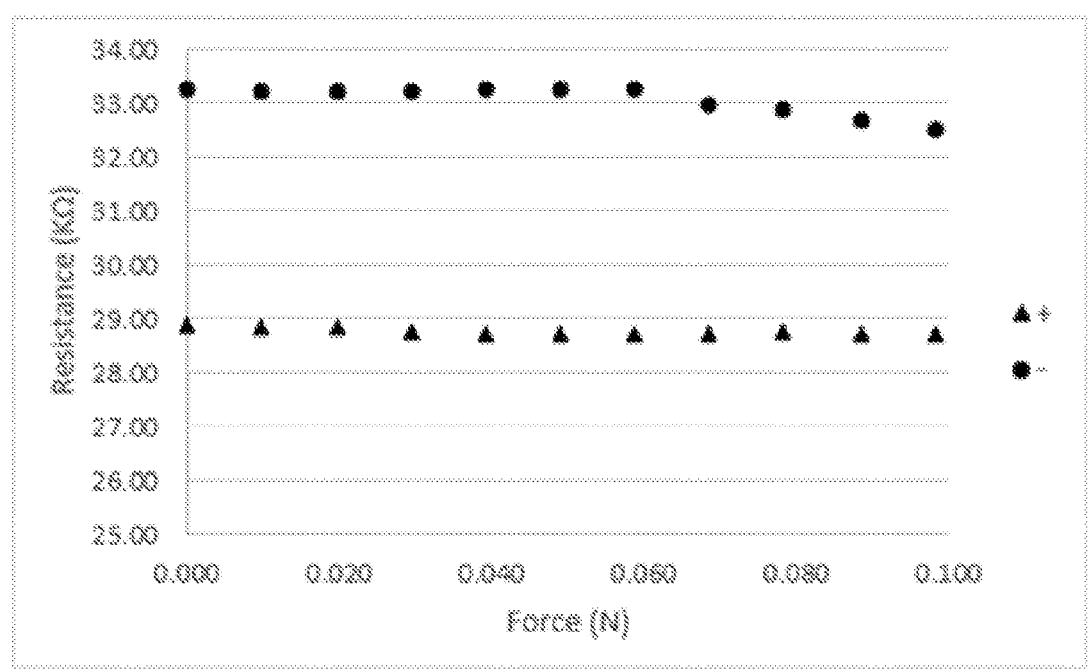

FIGS. 10A and 10B show example plots of resistance as a function of force for a force sensor having an interdigitated electrode configuration, such as for sensor 100 of FIGS. 1A and 1B. FIG. 10A is a plot 1000 of resistance as a function of applied force for a range of forces between 0-30 N. The triangles represent application of force, and the circles represent removal of applied force. As illustrated by plot 1000, the sensor is able to linearly detect application and removal of force in a larger range of forces than the cross-over electrode sensor configuration, such as approximately 5-30N. However, as shown by FIG. 10B, which shows a plot 1050 representing a magnification of plot 1000, the interdigitated electrode configuration may not exhibit a linear response to force in the relatively smaller amounts of force shown in FIG. 10B (e.g., 0-0.1N).

Figure 11A:
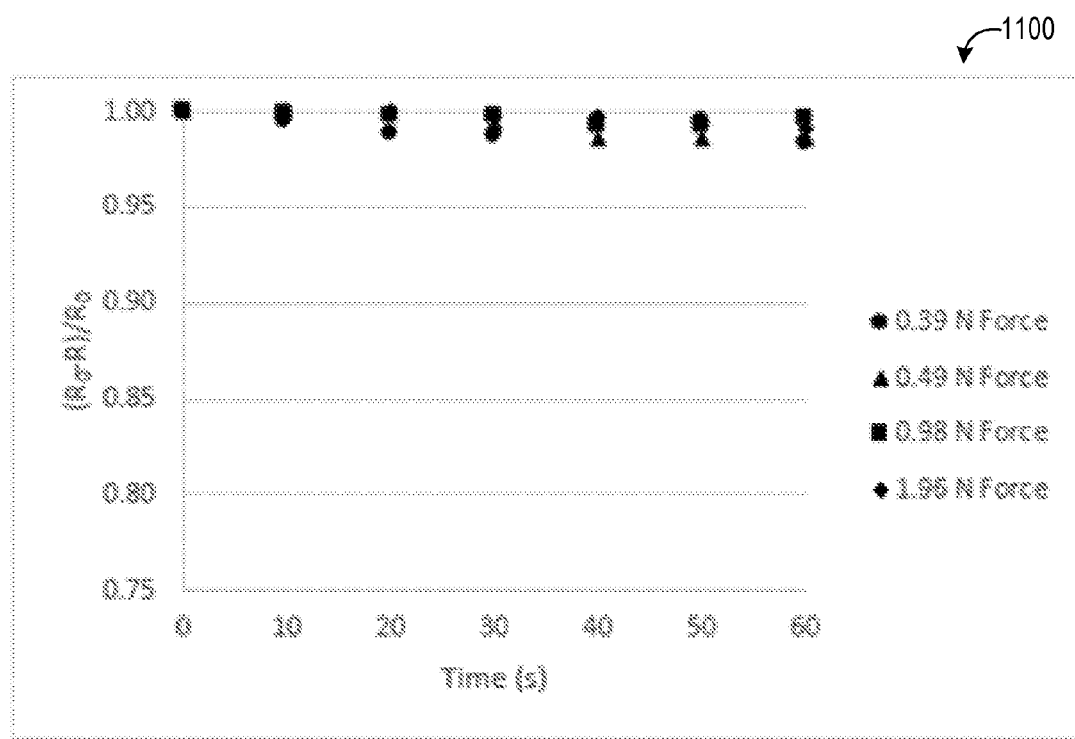
Figure 11B:
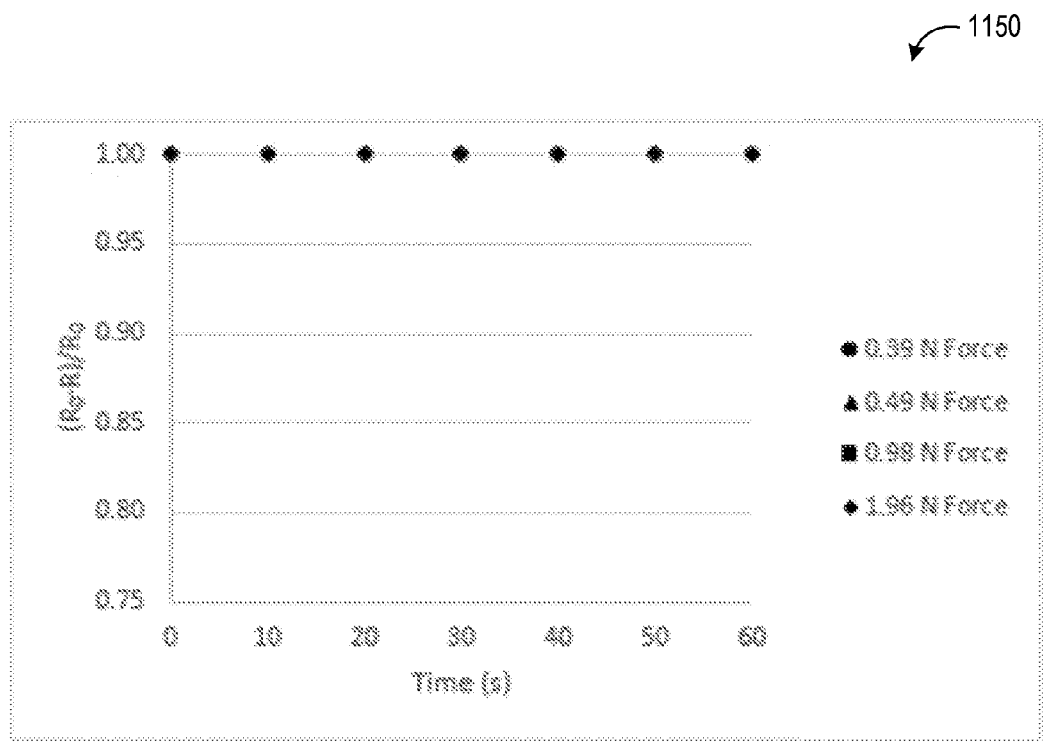

Further, as appreciated by FIGS. 11A and 11B, each sensor configuration exhibits a stable response to persistent applied force. FIG. 11A is a plot 1100 showing normalized resistance of a sensor having a cross-over electrode configuration (e.g., sensor 200) as a function of time for a plurality of applied forces, while FIG. 11B is a plot 1150 showing normalized resistance of a sensor having an interdigitated electrode configuration (e.g., sensor 100) as a function of time for the plurality of applied forces. For both sensor configurations, the resistance for a given amount of applied force remains substantially constant over the duration of time shown (e.g., 60 seconds). In plot 1150, the normalized resistance for only one force value is visible (e.g., 1.96 N). The normalized resistances for the remaining force values are substantially equal to those visible and hence are occluded in plot 1150.

A force sensor according to the present disclosure may be incorporated into any suitable device or article. Examples include, but are not limited to, wearable computing devices such as head-mounted display devices, band devices, such as watches, flexible/stretchable articles such as fabric (e.g., in clothing, furniture), bandages, orthotics, etc., and hand-held devices such as phones or tablet computers.

Figure 4:
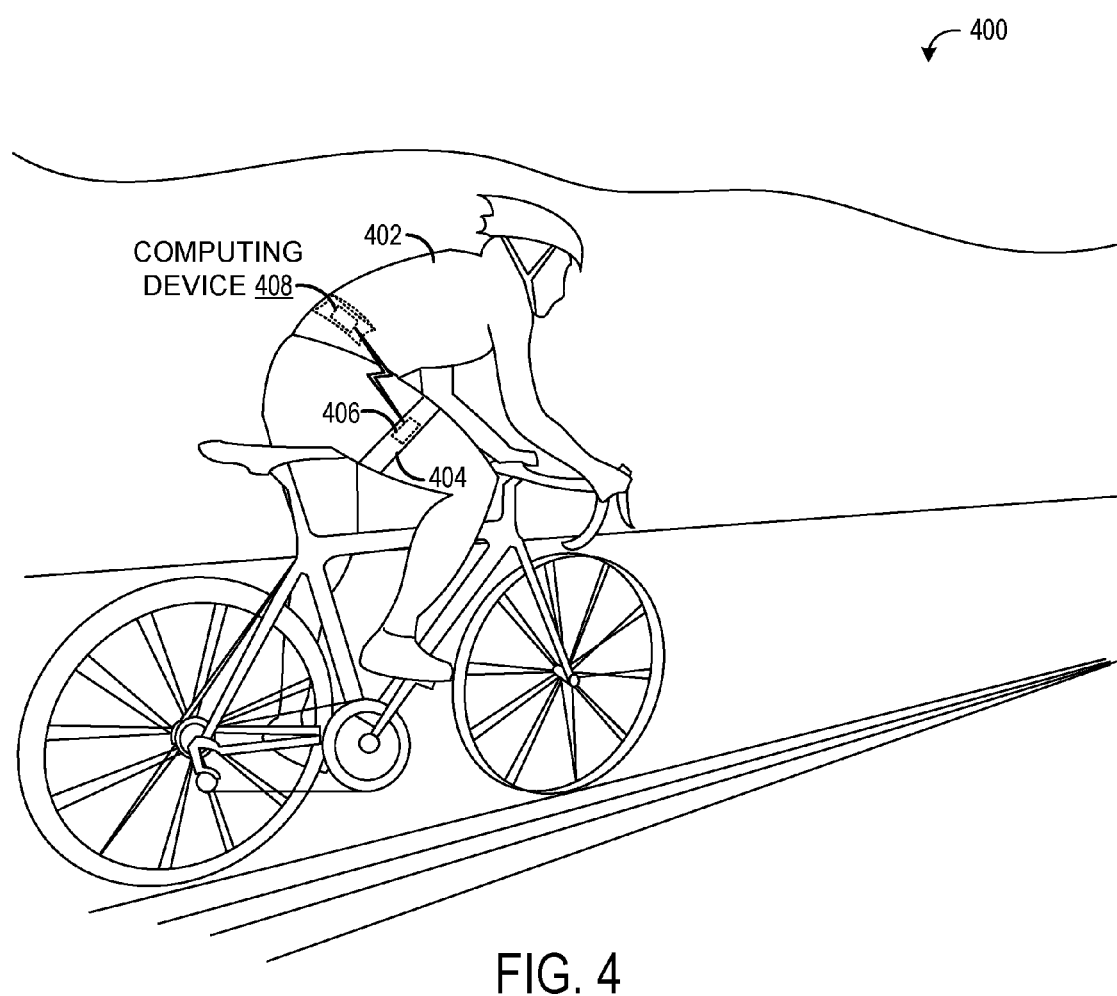
FIG. 4 shows an example stretchable article comprising an example force-sensing element.

FIG. 4 illustrates an example of a wearable article in the form of a band 404 including a force sensor 406, which is an example of sensor 100 of FIGS. 1A and 1B, sensor 200 of FIGS. 2A and 2B, and sensor array 300 of FIG. 3. Band 404 is configured to be worn around a body part of a user 402, for example around a leg of user 402 as shown in FIG. 4. Sensor 100 may be configured to detect force that may be induced by onset or recession of muscle swelling, muscle flexing, heartbeat, or other suitable body movement or function. Band 404 may be formed from any suitable material, including but not limited to fabrics and elastomeric materials. Sensor 406 may be mounted on an exterior of band 404, or may be incorporated into an interior of band 404. Sensor 406 may be configured to provide output to an operatively-coupled computing device 408 (e.g., a smartphone, activity tracker, or other device carried by the user 402) via a wired or wireless connection. Band 404 may take the form of a thin, belt-like strap, or a larger, sleeve-like enclosure.

Sensor 406 may output information usable by computing device 408 to monitor a condition of user 402, such as a level of muscle swelling, and notify user 402 and/or other users of the condition, for example to notify user 402 that his or her muscle is undergoing swelling so that user 402 can terminate his or her activity to prevent further injury. Similarly, such a sensor also may be used to monitor an injured muscle for recovery, e.g. by detecting a reduction in swelling of the injured muscle. In other examples, rather than be maintained in close contact with the leg of user 402 via band 404, sensor 406 may instead be incorporated into a pair of shorts, pants, shirt, socks, shoe, hat, or other article of clothing configured to have a suitably close fit to a body part.

Figures 5A, 5B:
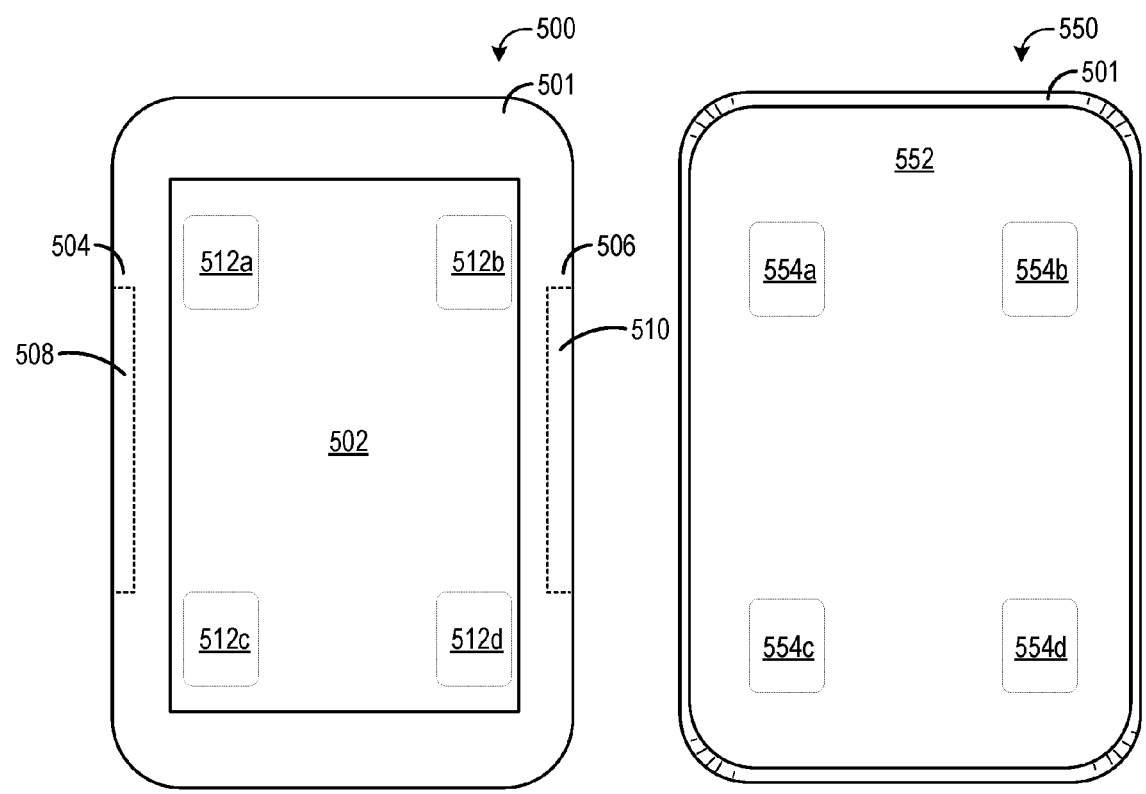
FIGS. 5A and 5B show an example device comprising an example force-sensing element.

A sensor according to the present disclosure also may be incorporated into a computing device. FIGS. 5A and 5B illustrate an example of a hand-held computing device 501 in the form of a tablet computing device. FIG. 5A is a front view 500 of the hand-held computing device 501 and FIG. 5B is a back view 550 of the hand-held computing device 501. The hand-held computing device 501 may include a display 502 configured to display user interface controls, images, etc., responsive to instructions executed by a process of the hand-held computing device (not shown).

Various surfaces of the hand-held computing device 501 may be formed from a soft, deformable, and/or flexible material. For example, a first side surface 504 and second side surface 506 of the front of the hand-held computing device, as well as a back surface 552 of hand-held computing device 501, may be at least partially formed from a fabric, elastomeric, or other soft-feeling material. As such, one or more sensors as disclosed herein may be incorporated into one or more locations of the soft exterior surfaces. In the example of FIG. 5A, a first sensor 508 may be incorporated in the material of the first side surface 504 and a second sensor 510 may be incorporated in the material of second side surface 506. As shown in FIG. 5B, a plurality of third sensors 554a, 554b, 554c, and 554d may be incorporated into the material of back surface 552. Further, display 502 may be comprised of a flexible cover, such as thin glass or plastic. A plurality of fourth sensors 512a, 512b, 512c, and 512d may be included under the flexible cover of display 502. Sensor 100 of FIGS. 1A and 1B, sensor 200 of FIGS. 2A and 2B, and sensor array 300 of FIG. 3 are examples of sensors that may be used for each of first sensor 508, second sensor 510, plurality of third sensors 554a-d, and plurality of fourth sensors 512a-d.

First sensor 508 and second sensor 510 may be configured to detect force applied to the first side surface 504 and second side surface 506 in order to measure a grip applied to hand-held computing device 501 when the device is held by a user. In such an example, force from a user's grip may be used for user interface interactions, e.g. to perform a selection operation in place of a mouse click or touch screen touch. The plurality of third sensors 554a-d may be configured to detect force-based inputs made to the back surface, for example. This may allow force-based user inputs to be made (e.g. by controlling a cursor or other suitable user interface mechanism) without having to release a grip of the hand-held computing device 501 to use a touch screen. The plurality of fourth sensors 512a-d may be configured to detect a level of force applied while a user is entering touch-based inputs to display 502, for example. It will be understood that hand-held computing device 501 may include a processor and storage comprising stored instructions executable by the processor to monitor the outputs of the sensors for such interactions, and to perform an action on the hand-held computing device responsive to a force-based input detected by one or more of the sensors. Example hardware configurations are described in more detail below.

In one example, the output from each of the plurality of third sensors 554a-d may be used to ascertain a single force value for the force-based input made to the back surface. The outputs from each third sensor may be averaged, for example, to determine a force value for a single force-based input to the back surface. In this way, variations in the force sensing among discrete sensors may be reduced. Likewise, the output from each of the plurality of fourth sensors 512a-d may be averaged or otherwise combined to determine a force value for a single force-based input to the display.

Further, first sensor 508, second sensor 510, the plurality of third sensors 554a-d, and/or the plurality of fourth sensors 512a-d may be incorporated into other suitable devices, including but not limited to a trackpad, stylus, and touch screen. An example device including a trackpad having multiple force sensors is described below with respect to FIG. 8.

Figure 6:
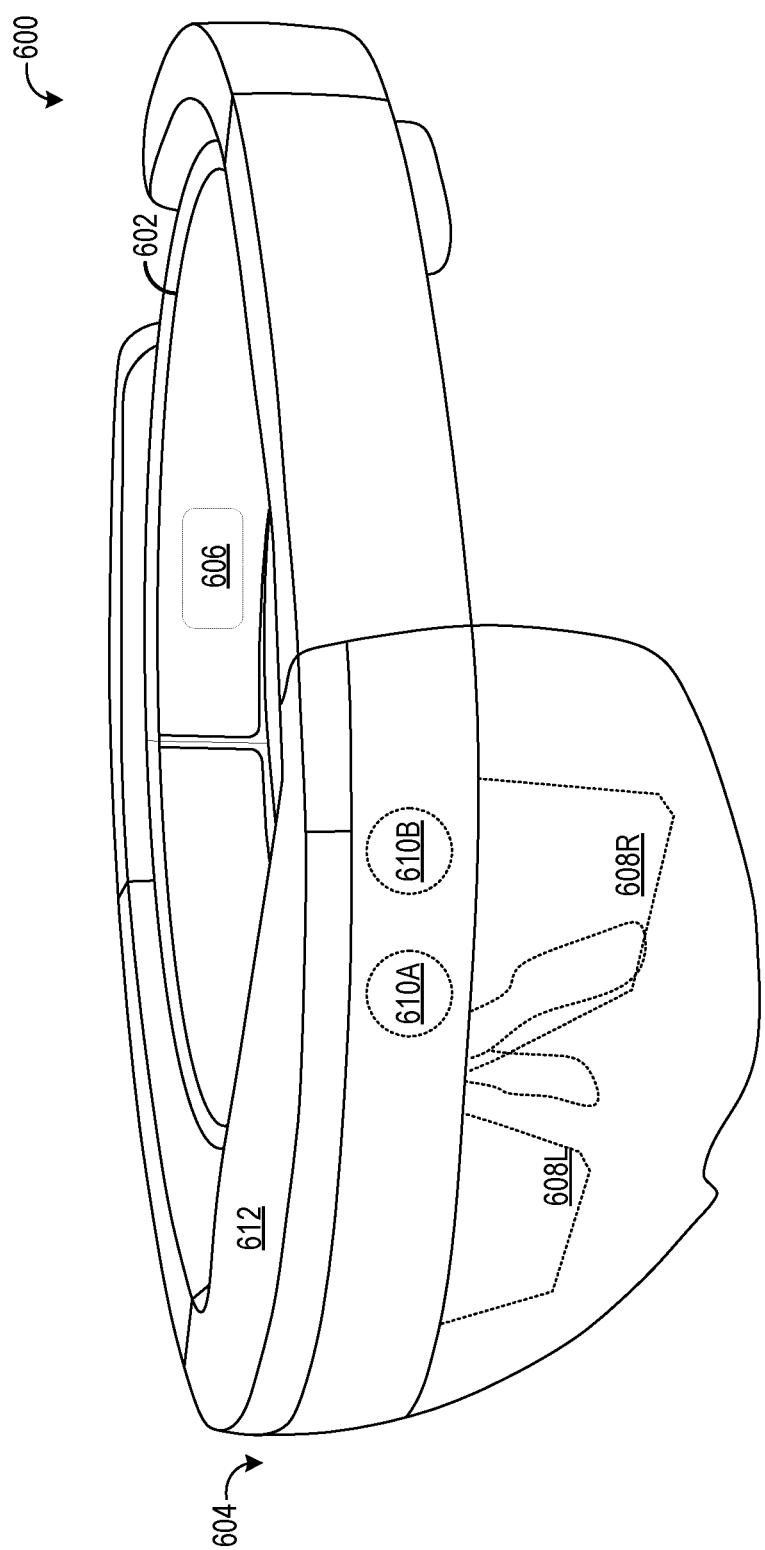
FIG. 6 shows another example device comprising an example force-sensing element.

FIG. 6 illustrates an example of a wearable computing device in the form of an example head-mounted display device (HMD) 600. The illustrated HMD includes an adjustable band 602 that supports componentry 604 of the HMD, including stereoscopic, see-through display componentry, configured to be positioned close to a user's eyes. Accordingly, the HMD may be used in augmented-reality applications, where real-world imagery is admixed with virtual display imagery. To increase comfort of a wearer of HMD 600, band 602 may be made of or include an outer layer of soft, deformable, and/or flexible material, such as fabric or an elastomeric material.

HMD 600 includes separate right and left display panels 608R/608L, cameras 610A/610B, and a controller 612. The controller is operatively coupled to the display panels, cameras, and other componentry. The controller includes logic and associated computer memory configured to provide image signal to the display panels, to receive video from the cameras, and to enact various control processes of the HMD. The controller may include a wired or wireless interface for exchanging data with a remote computer system, and/or receiving power from an external power source.

In order to maintain displayed images in desired registration with real-world objects, it may be desirable to maintain the display panels at a fixed location relative to a wearer's eyes, even as the wearer moves his or her head, thus dictating that adjustable band 602 be maintained in a relatively tight position around the head of the wearer. However, if band 602 is adjusted to a position that is too tight, force may be exerted against the wearer's head, leading to discomfort over time.

Thus, band 602 may include a force sensor 606 configured to detect a force exerted by band 602 against a wearers head. Sensor 100 of FIGS. 1A and 1B and sensor array 300 of FIG. 3 are examples of sensors that may be used as force sensor 606. If the level of tension exceeds a designated level, controller 612 may be configured to output a notification (via the display panels, for example) instructing the wearer to loosen band 602. In other examples, if the level of tension is less than a second threshold, controller 612 may be configured to output a notification (via the display panels, for example) instructing the wearer to tighten band 602. It will be understood that HMD 600 is presented as an example of a wearable computing device, and that one or more sensors as disclosed herein may be used on any other suitable wearable computing device.

Figure 7:
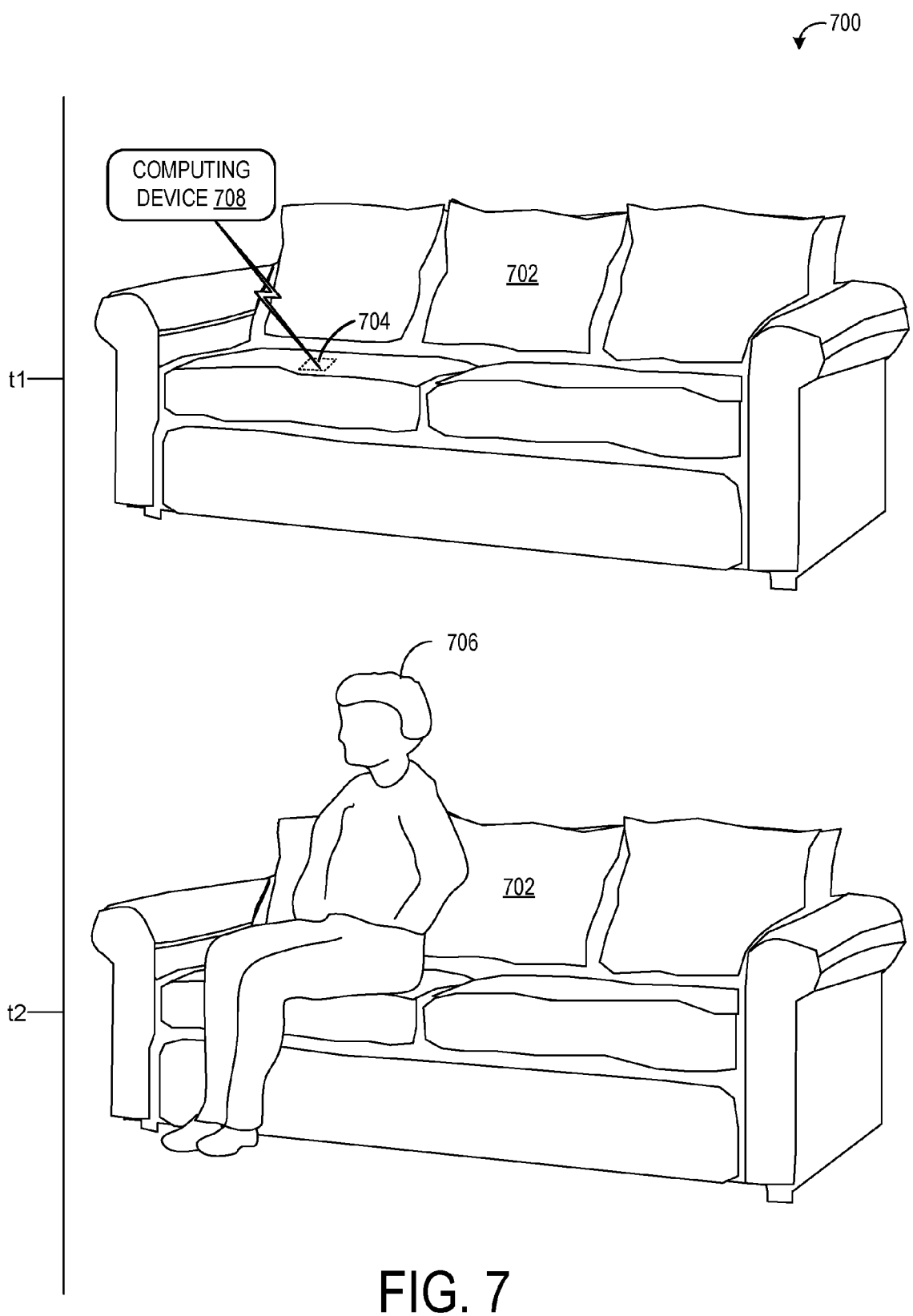
FIG. 7 shows another example article comprising an example force-sensing element.

FIG. 7 illustrates an example of an article in the form of a couch 702 including a force sensor 704. Sensor 100 of FIGS. 1A and 1B and sensor array 300 of FIG. 3 are examples of sensor 704. Sensor 704 may be incorporated into the exterior surface of a cushion of couch 702. Specifically, FIG. 7 is a timeline 700 illustrating a user 706 applying force to the couch, as detected by sensor 704. At time t1, couch 702 is currently unused. As such, no force is detected by sensor 704. At time t2, user 706 sits on the cushion including sensor 704. As a result, sensor 704 detects the force placed on the couch by user 706. Sensor 704 may be operatively coupled to a computing device 708 via a wired or wireless connection. Computing device 708 may be a suitable device, such as a wearable computing device of user 706, a home entertainment system, and/or other suitable device. The output from sensor 704 may be used by computing device 708 to detect that user 706 is sitting on couch 702, for example. By detecting that user 706 is sitting on couch 702, various actions may be taken, including but not limited to automatically activating a display device (e.g., television) located in the environment or notifying user 706 when he or she has sat for a threshold duration, in order to encourage user 706 to stand up. Further, sensor 704 may be incorporated into other suitable devices or articles, including but not limited to car seats (e.g., in order to detect presence of a passenger in a seat), cribs, beds, and the like.

Figure 8:
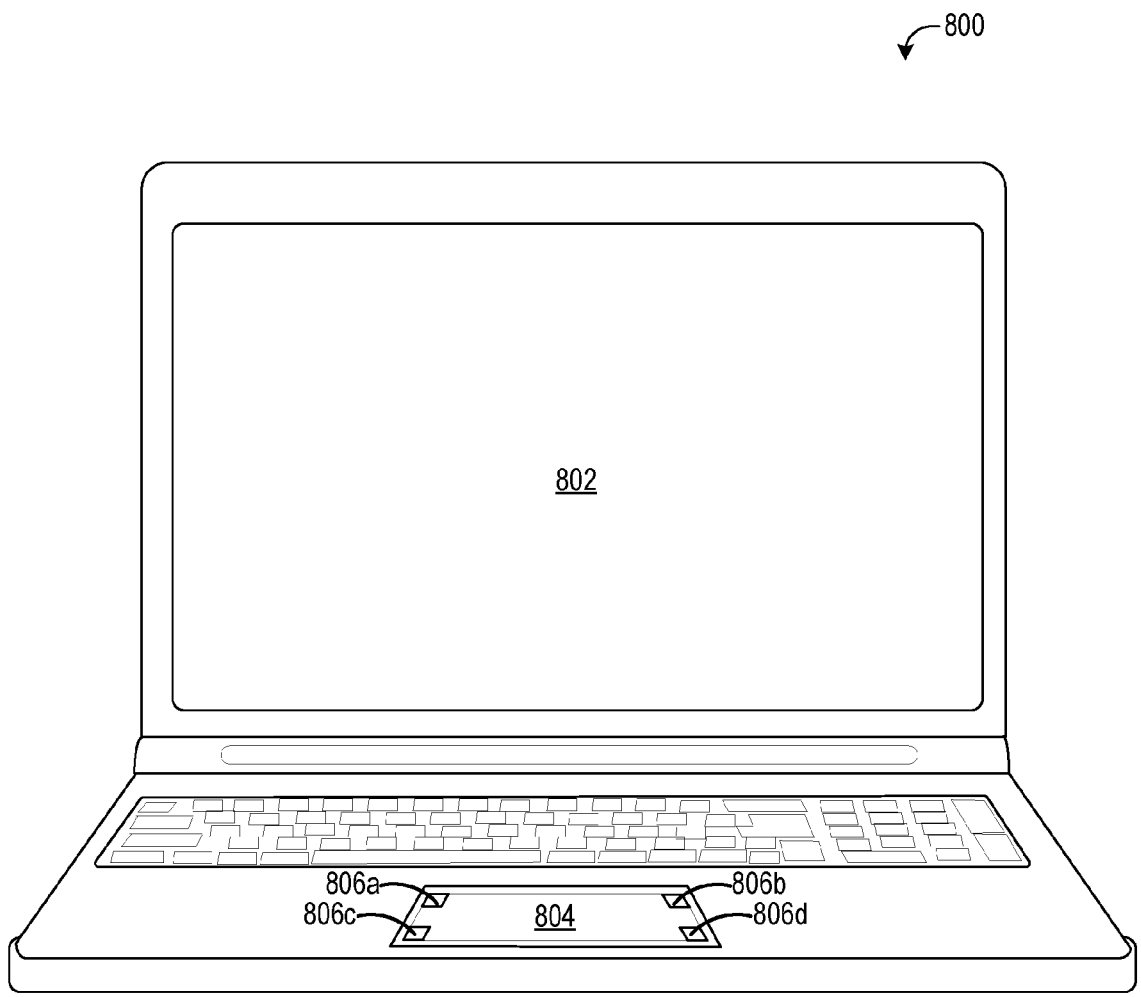
FIG. 8 shows another example device comprising an example force-sensing element.

FIG. 8 illustrates an example laptop computing device 800 including a trackpad 804. Trackpad 804 include a touch sensor or other suitable tracking device configured to translate user touch into controls for computing device 800. Trackpad 804 also includes a plurality of force sensors, illustrated as four force sensors 806a-806d. Each force sensor may be positioned at or adjacent to a respective corner of trackpad 804, although other configurations also may be used. Sensor 100 of FIGS. 1A and 1B, sensor 200 of FIGS. 2A and 2B, and sensor array 1200 of FIG. 12 are examples of sensors that may be used for each of the plurality of force sensors 806a-806d.

The output from the force sensors may be used to detect a relative amount of force applied by a user to the trackpad, which may be used as user input. In some examples, the output from each of the plurality of force sensors may be computationally combine (e.g. by averaging or other suitable operation) to determine a force value for use as computing device input. By combining the output from the plurality of force sensors, the effect of any hysteresis exhibited by each of the force sensors may be reduced.

Figure 13:
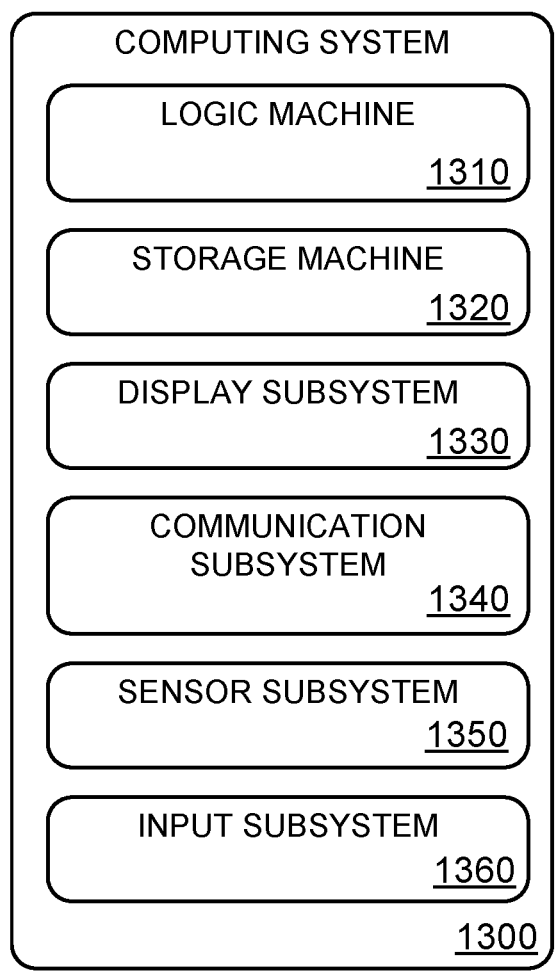
FIG. 13 schematically shows an example computing device.

FIG. 13 schematically shows a non-limiting embodiment of a computing system 1300 that may enact one or more of the methods and processes described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), and/or other computing devices. Computing system 1300 is a non-limiting example of computing device 408, hand-held computing device 501, HMD 600, computing device 708, and/or computing device 800 described above with respect to FIGS. 4-8, respectively. Further, local and/or remote computing systems configured to receive output from the force sensor of the disclosure may also be non-limiting examples of computing system 1300.

Computing system 1300 includes a logic machine 1310 and a storage machine 1320. Computing system 1300 may optionally include a display subsystem 1330, input subsystem 1360, communication subsystem 1340, sensor subsystem 1350, and/or other components not shown in FIG. 13.

Logic machine 1310 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1320 includes one or more physical devices configured to hold instructions executable by the logic machine to implement the methods and processes described herein. When such methods and processes are implemented, the state of storage machine 1320 may be transformed—e.g., to hold different data.

Storage machine 1320 may include removable and/or built-in devices. Storage machine 1320 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1320 may include volatile, nonvolatile, dynamic, static, read/write, read-only, random-access, sequential-access, location-addressable, file-addressable, and/or content-addressable devices.

It will be appreciated that storage machine 1320 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1310 and storage machine 1320 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1330 may be used to present a visual representation of data held by storage machine 1320. This visual representation may take the form of a graphical user interface (GUI). As the herein described methods and processes change the data held by the storage machine, and thus transform the state of the storage machine, the state of display subsystem 1330 may likewise be transformed to visually represent changes in the underlying data. Display subsystem 1330 may include one or more display devices utilizing virtually any type of technology. Such display devices may be combined with logic machine 1310 and/or storage machine 1320 in a shared enclosure, or such display devices may be peripheral display devices.

When included, input subsystem 1360 may comprise or interface with one or more user-input devices such as a keyboard, mouse, touch screen, or game controller. In some embodiments, the input subsystem may comprise or interface with selected sensors of sensor subsystem 1350, such as natural user input (NUI) componentry. Such componentry may be integrated or peripheral, and the transduction and/or processing of input actions may be handled on- or off-board. Example NUI componentry included in sensor subsystem 1350 may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition, as well as electric-field sensing componentry for assessing brain activity. Sensor subsystem 1350 may include one or more force sensors, such as sensor 100, sensor 200, or sensor array 300 described above with respect to FIGS. 1, 2 and 3, respectively.

When included, communication subsystem 1340 may be configured to communicatively couple computing system 1300 with one or more other computing devices. Communication subsystem 1340 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

Another example provides a method comprising printing a suspension of a hollow-sphere conductive polymer in a liquid carrier over an electrode pair on a substrate, evaporating the liquid carrier, and encapsulating the electrode pair and hollow-sphere conductive polymer to form a force sensor. The hollow-sphere conductive polymer may additionally or alternatively comprise hollow-sphere polypyrrole, and the liquid carrier may additionally or alternatively comprise a polar solvent. Such an example may additionally or alternatively further include synthesizing the hollow-sphere conductive polymer by mixing a monomer with an oxidative agent and a cross-linker, wherein after synthesizing, the hollow-sphere conductive polymer solidifies, recovering the solidified hollow-sphere conductive polymer, and suspending the recovered hollow-sphere conductive polymer in the liquid carrier to form the suspension of the hollow-sphere conductive polymer. Suspending the recovered hollow-sphere conductive polymer in the liquid carrier may additionally or alternatively comprise ultrasonically agitating the recovered hollow-sphere conductive polymer in the liquid carrier. Printing the suspension of the hollow-sphere conductive polymer over the electrode pair may additionally or alternatively include printing the suspension of the hollow-sphere conductive polymer over an interdigitated electrode pair. Printing the suspension of the hollow-sphere conductive polymer over the electrode pair may additionally or alternatively include printing the suspension of the hollow-sphere conductive polymer over a plurality of electrode pairs arranged in an array. Printing the suspension of the hollow-sphere conductive polymer over the electrode pair may additionally or alternatively include printing the suspension of the hollow-sphere conductive polymer over the electrode pair via one or more of screen printing, inkjet printing, gravure printing, electrohydrodynamic printing, pneumatic-driven extrusion, manual micro pipetting, and stamping. Any or all of the above-described examples may be combined in any suitable manner in various implementations.

Another example provides a sensor array, comprising a plurality of electrode pairs each having a hollow-sphere conductive polymer in contact with a first electrode and a second electrode and bridging a gap therebetween, and an encapsulating material encapsulating each electrode pair, such that a gap without the hollow-sphere conductive polymer is present between each adjacent electrode pair. The hollow-sphere conductive polymer may additionally or alternatively include hollow-sphere polypyrrole. The liquid carrier may additionally or alternatively include a polar solvent. Such an example may additionally or alternatively include, for each electrode pair, the second electrode being interdigitated with the first electrode. Such an example may additionally or alternatively include, for each electrode pair, the second electrode being separated from the first electrode by a layer of the hollow-sphere conductive polymer. Such an example may additionally or alternatively include the sensor array being disposed behind a surface of a device. Any or all of the above-described examples may be combined in any suitable manner in various implementations.

Another example provides a device comprising a plurality of force-sensing elements disposed behind a force-interactive surface, each force-sensing element comprising one or more electrode pairs and an encapsulating material encapsulating each electrode pair, each electrode pair having a hollow-sphere conductive polymer deposited in contact with a first electrode and a second electrode. The hollow-sphere conductive polymer may additionally or alternatively include hollow-sphere polypyrrole. The device may additionally or alternatively include one of a tablet computing device, a mobile computing device, and a wearable computing device. Such an example may additionally or alternatively include each force-sensing element of the plurality of force-sensing elements being disposed behind a different location of the force-interactive surface. Such an example may additionally or alternatively include a processor and storage comprising stored instructions executable by the processor to receive output from each force-sensing element of the plurality of force-sensing elements, and output a force value based on the output from each force-sensing element of the plurality of force-sensing elements. The instructions to output the force value may additionally or alternatively include instructions to output an average of the output from each force-sensing element of the plurality of force-sensing elements as the force value. Such an example may additionally or alternatively include, for each electrode pair, the first electrode being interdigitated with the second electrode. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of

The invention claimed is:

1. A method, comprising:
   printing a suspension of a hollow-sphere conductive polymer in a liquid carrier over an electrode pair on a substrate;
   evaporating the liquid carrier; and
   encapsulating the electrode pair and hollow-sphere conductive polymer to form a force sensor.

2. The method of claim 1, wherein the hollow-sphere conductive polymer comprises hollow-sphere polypyrrole, and wherein the liquid carrier comprises a polar solvent.

3. The method of claim 1, further comprising:
   synthesizing the hollow-sphere conductive polymer by mixing a monomer with an oxidative agent and a cross-linker, wherein after synthesizing, the hollow-sphere conductive polymer solidifies;
   recovering the solidified hollow-sphere conductive polymer; and
   suspending the recovered hollow-sphere conductive polymer in the liquid carrier to form the suspension of the hollow-sphere conductive polymer.

4. The method of claim 3, wherein suspending the recovered hollow-sphere conductive polymer in the liquid carrier comprises ultrasonically agitating the recovered hollow-sphere conductive polymer in the liquid carrier.

5. The method of claim 1, wherein printing the suspension of the hollow-sphere conductive polymer over the electrode pair comprises printing the suspension of the hollow-sphere conductive polymer over an interdigitated electrode pair.

6. The method of claim 1, wherein printing the suspension of the hollow-sphere conductive polymer over the electrode pair comprises printing the suspension of the hollow-sphere conductive polymer over a plurality of electrode pairs arranged in an array.

7. The method of claim 1, wherein printing the suspension of the hollow-sphere conductive polymer over the electrode pair comprises printing the suspension of the hollow-sphere conductive polymer over the electrode pair via one or more of screen printing, inkjet printing, gravure printing, electrohydrodynamic printing, pneumatic-driven extrusion, manual micro pipetting, and stamping.

8. A sensor array, comprising:
   a plurality of electrode pairs each comprising a first electrode and a second electrode in an interdigitated arrangement on a first layer;
   a layer of a hollow-sphere conductive polymer in contact with the first electrode and the second electrode and bridging a gap therebetween; and
   an encapsulating material encapsulating each electrode pair, such that a gap without the hollow-sphere conductive polymer is present between each adjacent electrode pair.

9. The sensor array of claim 8, wherein the hollow-sphere conductive polymer comprises hollow-sphere polypyrrole.

10. The sensor array of claim 8, wherein the liquid carrier comprises a polar solvent.

11. The sensor array of claim 8, wherein, for each electrode pair, the second electrode is interdigitated with the first electrode.

12. The sensor array of claim 8, wherein, for each electrode pair, the second electrode is separated from the first electrode by the layer of the hollow-sphere conductive polymer.

13. The sensor array of claim 8, wherein the sensor array is disposed behind a surface of a device.

14. A device, comprising:
   a plurality of force-sensing elements disposed behind a force-interactive surface, each force-sensing element comprising one or more electrode pairs and an encapsulating material encapsulating each electrode pair, each electrode pair comprising a first electrode and a second electrode in an interdigitated arrangement on a first layer, and the device further comprising a layer of a hollow-sphere conductive polymer in contact with the first electrode and the second electrode.

15. The device of claim 14, wherein the hollow-sphere conductive polymer comprises hollow-sphere polypyrrole.

16. The device of claim 14, wherein the device comprises one of a tablet computing device, a mobile computing device, and a wearable computing device.

17. The device of claim 14, wherein each force-sensing element of the plurality of force-sensing elements is disposed behind a different location of the force-interactive surface.

18. The device of claim 14, further comprising a processor and storage comprising stored instructions executable by the processor to:
   receive output from each force-sensing element of the plurality of force-sensing elements; and
   output a force value based on the output from each force-sensing element of the plurality of force-sensing elements.

19. The device of claim 18, wherein the instructions to output the force value include instructions to output an average of the output from each force-sensing element of the plurality of force-sensing elements as the force value.

20. The device of claim 14, wherein for each electrode pair, the first electrode is interdigitated with the second electrode.

* * * * *